No. 762,748. PATENTED JUNE 14, 1904.
B. P. O'NEILL.
TIME GAS LIGHTER.
APPLICATION FILED AUG. 12, 1903.
NO MODEL. 8 SHEETS—SHEET 1.

Witnesses
Inventor
Bryan P. O'Neill
By Victor J. Evans
Attorney

No. 762,748. PATENTED JUNE 14, 1904.
B. P. O'NEILL.
TIME GAS LIGHTER.
APPLICATION FILED AUG. 12, 1903.
NO MODEL. 8 SHEETS—SHEET 3.

Inventor
Bryan P. O'Neill.
By Victor J. Evans
Attorney

Witnesses

No. 762,748. PATENTED JUNE 14, 1904.
B. P. O'NEILL.
TIME GAS LIGHTER.
APPLICATION FILED AUG. 12, 1903.
NO MODEL. 8 SHEETS—SHEET 4.

No. 762,748. PATENTED JUNE 14. 1904.
B. P. O'NEILL.
TIME GAS LIGHTER.
APPLICATION FILED AUG. 12, 1903.
NO MODEL. 8 SHEETS—SHEET 5.

Witnesses
F. W. Rey.
O. G. Heytmuyp

Inventor
Bryan P. O'Neill.
By Victor J. Evans
Attorney

No. 762,748. PATENTED JUNE 14, 1904.
B. P. O'NEILL.
TIME GAS LIGHTER.
APPLICATION FILED AUG. 12, 1903.
NO MODEL. 8 SHEETS—SHEET 8.

Fig. 16.

Witnesses
F. W. Riley.
Alfred C. Lawson.

Bryan P. O'Neill. Inventor

By Victor J. Evans Attorney

No. 762,748. Patented June 14, 1904.

UNITED STATES PATENT OFFICE.

BRYAN P. O'NEILL, OF ALLENTOWN, PENNSYLVANIA.

TIME GAS-LIGHTER.

SPECIFICATION forming part of Letters Patent No. 762,748, dated June 14, 1904.

Application filed August 12, 1903. Serial No. 169,262. (No model.)

*To all whom it may concern:*

Be it known that I, BRYAN P. O'NEILL, a citizen of the United States, residing at Allentown, in the county of Lehigh and State of Pennsylvania, have invented new and useful Improvements in Automatic Time-Lights, of which the following is a specification.

This invention relates to automatic timelights, the aim of the invention being to provide a device which operates automatically to extinguish a light at a predetermined time or after the lapse of an interval of predetermined length. The device is so constructed and the mechanism thereof so arranged that the mechanism may be set at any time to extinguish the light after the interval determined upon has elapsed.

The automatic time-light forming the subject-matter of this invention is especially designed with reference to the needs of photographers for the purpose of enabling photographic paper when placed behind a negative to be exposed for any desired length of time, according to the rapidity of the paper, the density of the negative, and other conditions. By means of the construction hereinafter described negatives of different sizes and of different densities or printing qualities may be exposed and given the proper time of exposure at one and the same time. The invention does away with the necessity of counting or timing by means of an ordinary watch and enables the photographer to proceed with other work after once setting the automatic timing device, as will hereinafter more fully appear.

With the above and other objects in view the invention consists in the novel construction, combination, and arrangement of parts, as hereinafter fully described, illustrated, and claimed.

In the accompanying drawings,
Fig. 16 is a vertical crosssection through the mechanism, taken in line with the central arbor.

Like reference-numerals designate corresponding parts in all the figures of the drawings.

The automatic light regulating and controlling device contemplated in this invention comprises a case 1 of any suitable description, preferably of a form resembling an ordinary alarm-clock and containing the usual clock mechanism 2, of which 3 designates the centrally-located arbor, which carries and controls the movement of the minute-hand, said arbor making one complete revolution in each hour.

Mounted by preference upon the exterior of the case 1, which may properly be termed the "clock-case," is an alarm-bell 4, in connection with which a hammer, hereinafter particularly described, operates.

In carrying out the present invention the arbor 3 is extended to provide for the mounting of the several parts hereinafter described. The extension of the minute-hand arbor is preferably accomplished by means of a tube 5, which is slipped over the projecting end of the arbor and secured thereto by a pin or other suitable fastener, whereby the sleeve is caused to rotate with the arbor.

Connected fast to the inner end of the tube or sleeve 5 is a friction-clutch 6, preferably formed of a piece or spring sheet metal provided with a series of radiating arms which are bent so as to bear directly and with a yielding pressure against the inner face of a tripping-disk 7, which lies directly in front of the clutch. The clutch therefore rotates with the tube or sleeve 5 and makes one complete revolution every hour.

Located between the frictional clutch and the adjacent frame-plate of the clock mechanism is a toothed wheel 8, having sixty teeth, one for each minute. This wheel is mounted loosely on the minute-arbor and has connected therewith an arm 9, which extends radially outward therefrom and has its outer extremity beveled or made tapering, so as to constitute a pointer or indicating-hand, which is adapted to swing through the arc of a complete circle and over the exposed face of a graduated annulus or dial 10, having sixty graduations thereon numbered from "1" to "60." The arm 9 also constitutes a stop, in conjunction with which a pin 11 on the tripping-disk coöperates, said arm serving to stop the pin, and therefore the disk 7, after the latter has been turned a certain distance, as will hereinafter more clearly appear. The toothed wheel 8 is operated by means of a toothed pinion 12, which meshes therewith and which is mounted on the forward end of a shaft 13, which passes through the casing and is provided at the rear with an operating device 14, preferably in the form of a milled wheel or thumb-piece, by turning which the toothed wheel 8 may be revolved any desired distance, so as to bring the extremity of the arm 9 to register with any one of the graduations on the dial.

The toothed wheel 8 may be locked at any point of adjustment by means of a locking-dog 15, preferably in the form of a pin or stud, carried by the crank-arm 16 on the forward end of the shaft 17, extending to the rear of the casing, where it is provided with an operating-handle 18. By vibrating said handle 18 in the direction indicated by the arrow in the rear elevation the dog or pin 15 is moved out of engagement with the teeth of the wheel 8, which allows the pinion 12 to be turned by means of the head 14 so as to reset the combined pointer and stop arm 9. By the means described the toothed wheel is not only locked against rotation, but also the arm 9, which is fastened to said wheel; therefore the tripping-disk 7 can only be turned backward until the pin 11 thereof comes in contact with the stop-arm 9, and it is by this means that the clock mechanism is set to run a certain time before sounding the alarm and operating the light-controlling device hereinafter more particularly described.

19 designates a spring which operates to hold the locking-dog normally in engagement with the toothed wheel 8.

Located within the casing is a bracket 20, provided with a journal 21, on which is pivotally mounted one end of a light-controlling arm 22. This arm extends across the face of the disk 7 and projects at its free end through a slot 23 at the side of the case. The free end of this arm is screw-threaded to receive an internally-threaded fork 24, which is thus free to turn on the arm and may thus be said to have a swiveled connection therewith. The fork 24 receives the free or swinging end of the stem 25 of the valve 26 of a gas fixture or jet 27, so that as the arm 22 is moved upward and downward the valve 26 is turned so as to shut off or turn on the gas.

At a point intermediate its ends the main arm 22 is provided with a catch-lip 28, having a beveled face 29 and adapted when lifted to pass and be engaged by the lip 30 of a spring-catch 31, which is pivotally mounted on a pin or stud 32, projecting from a bracket 33, mounted within the casing, the spring-catch being thus adapted to swing to one side to allow the catch-lip to pass thereby and back again to engage said catch, the backward movement of the spring-catch being limited by means of the projection or stop 34 on said bracket. 35 represents a spring for normally holding the spring-catch in position to engage the catch-lip on the main arm 22. Thus as the arm 22 is raised the spring-catch engages the catch-lip on said arm and holds the arm elevated until it is released.

In order to release the arm 22, the tripping-disk 7 is provided with a trip or release-catch 36, which is pivotally mounted, preferably, on the rear side of said disk and controlled by means of a spring 37, so that the point of the release-catch or trip normally projects beyond the outer edge or periphery of said disk. As the tripping-disk turns in a clockwise direction the release-catch or trip comes in contact with the lip of the spring-catch 31, pushing said lip from beneath the catch-lip 28 on the main arm 22, whereupon said arm falls by gravity, rocking the valve-stem and shutting off the gas or turning the same down low.

The means for setting the several previously-described parts of the mechanism consists of what I term a "setting-disk" 38, which is provided with a central sleeve 39, mounted loosely on the tube or sleeve 5. The disk is provided upon its outer face with a handle 40, by means of which it may be turned, and also has represented thereon an arrow 41 to indicate the direction in which the disk must be turned. Upon its inner face the disk is provided with a stud 42, which in moving upward engages beneath the arm 22 and raises said arm until it is caught and held by the spring-catch. The setting-disk also has upon its inner face a pin or projection 43, which engages the projecting free end of a return-spring 44, which is coiled around the tube 5 and held fast at one end. The spring 44 allows the disk to be turned in the direction indicated by the arrow, but restores said disk to its initial position as soon as the disk is released after elevating the arm 22. The disk 38 is also provided upon its outer face with a mark 45, adapted to register with one edge of the combined pointer and stop arm, said mark indicating the limit of movement which may be given to the setting-disk, and consequently to the tripping-disk 7, in an anticlockwise direction.

As the arm 22 falls just before reaching the lower limit of its movement, it comes in contact with the forwardly-projecting and substantially horizontal arm 46 of a bell-crank lever 47, mounted upon the outside of the case 1, said lever being held by means of a spring 48 against a stop 49, which maintains the arm 46 in proper position to be struck by the descending light-controlling arm 22. The other arm on the bell-crank has connected therewith a hammer-arm 50, provided with a hammer 51, which, by the means described, is thrown against the bell 4 simultaneously with the turning out or turning down of the gas.

Figure 1:
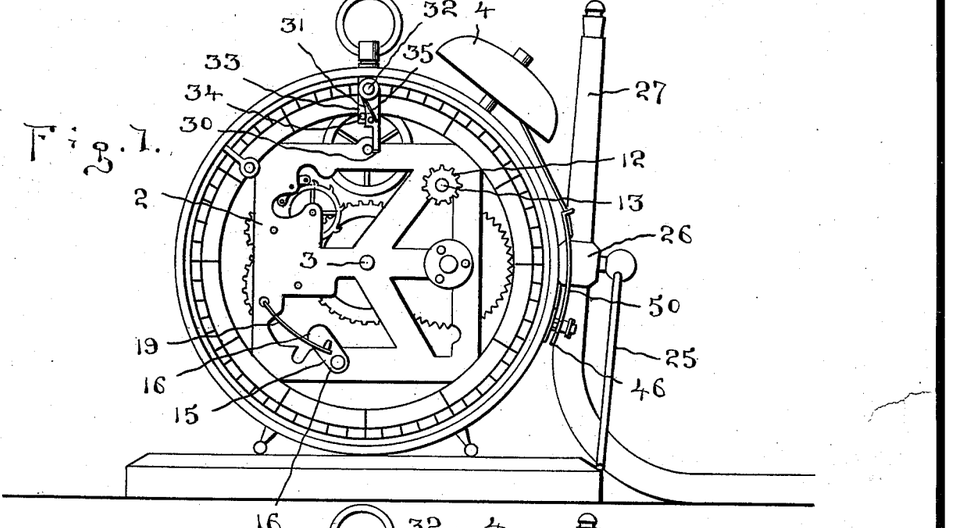
Figure 1 is a front elevation of a clock, showing an ordinary clock mechanism, the locking-dog of this invention, and also the spring-catch and main arm-supporting brackets which form parts of this invention, also showing the extra pinion by means of which the device is set for giving the required time of exposure.
Figure 2:
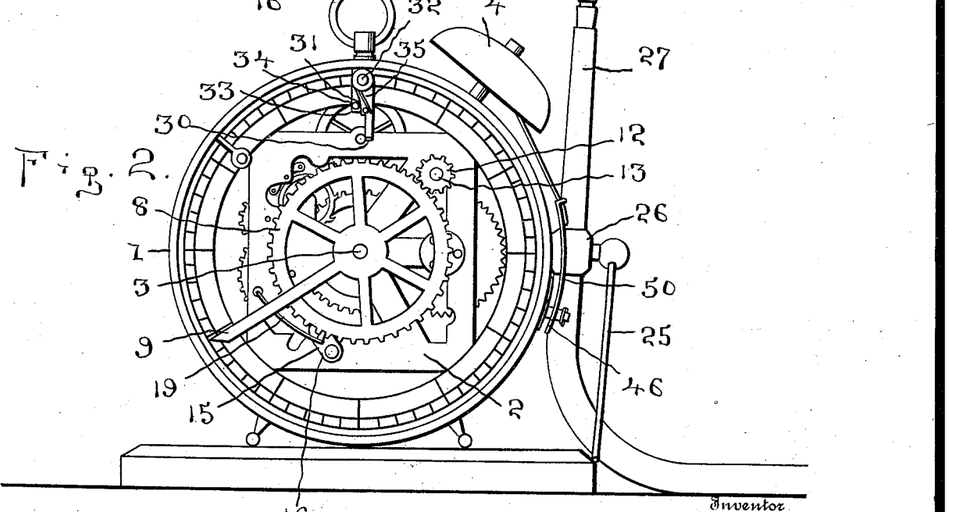
Fig. 2 is a similar view showing the toothed wheel and the combined pointer and stop arm.
Figure 3:
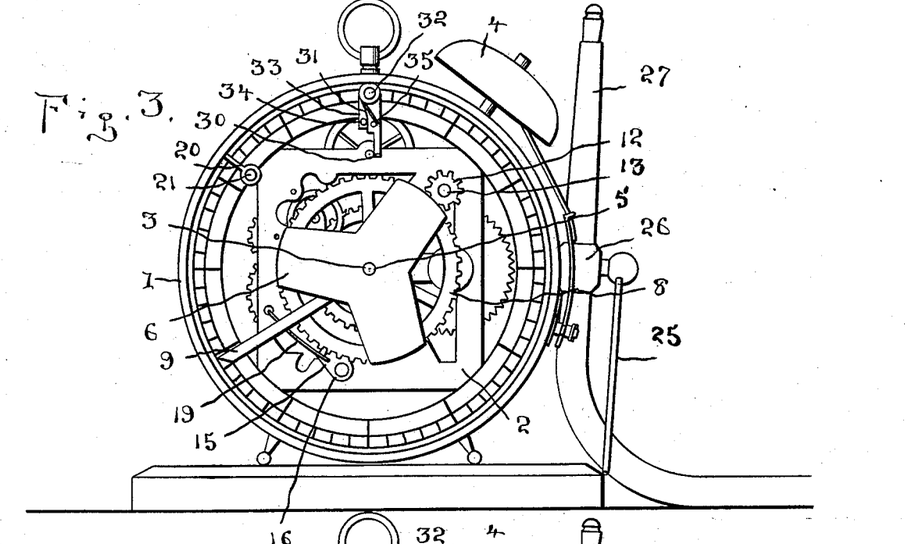
Fig. 3 is a similar view showing the friction-clutch added.
Figure 4:
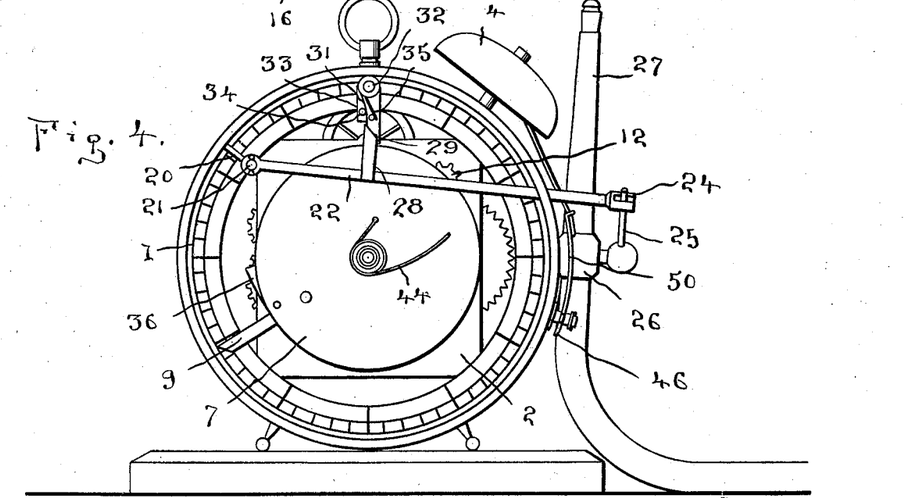
Fig. 4 is a similar view showing the clutch-operated disk and the main light-controlling arm.
Figure 5:
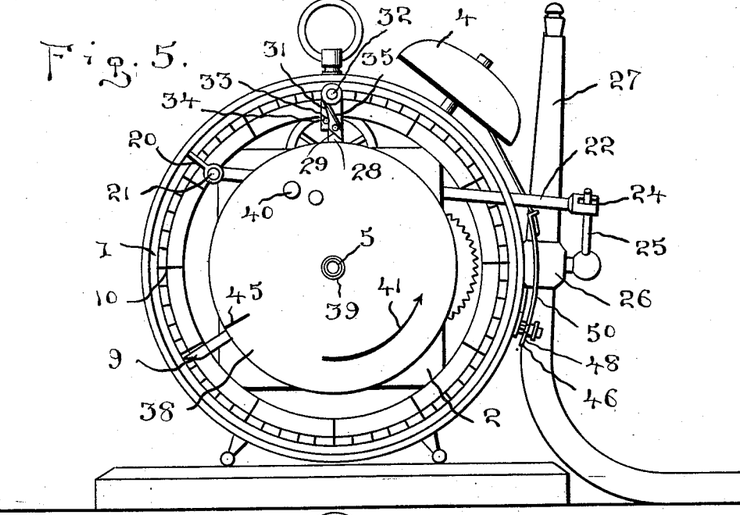
Fig 5 is a similar view showing the setting-disk under the position it assumes when setting the light-controlling arm and clutch-operated disk or tripping device.
Figure 6:
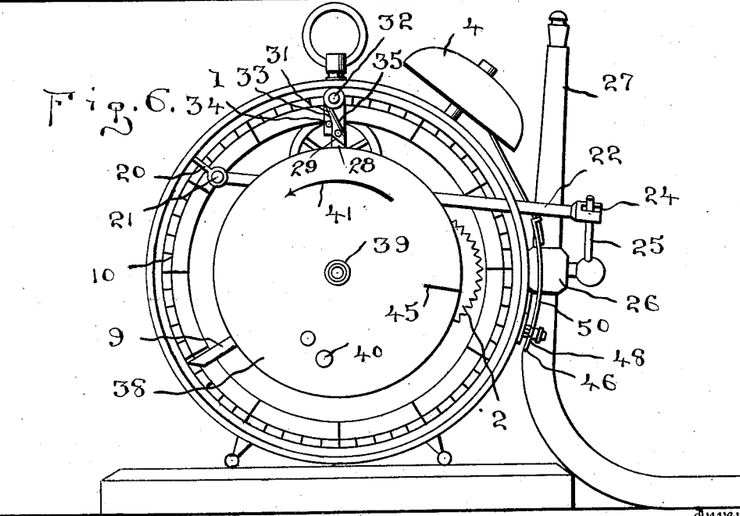
Fig. 6 is a similar view showing the normal position of the setting-disk.
Figure 7:
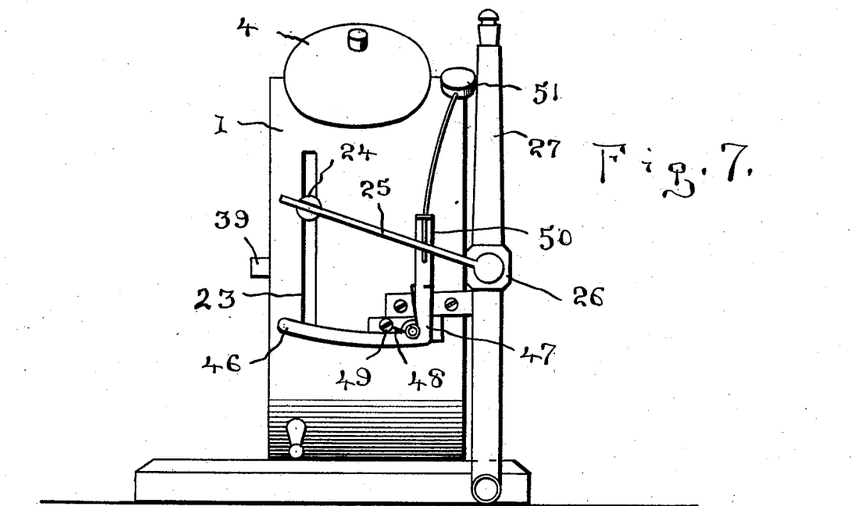
Fig. 7 is a perspective view of the device, showing the alarm mechanism, the gas-jet, and relation between the valve-stem and light-controlling arm.
Figure 8:
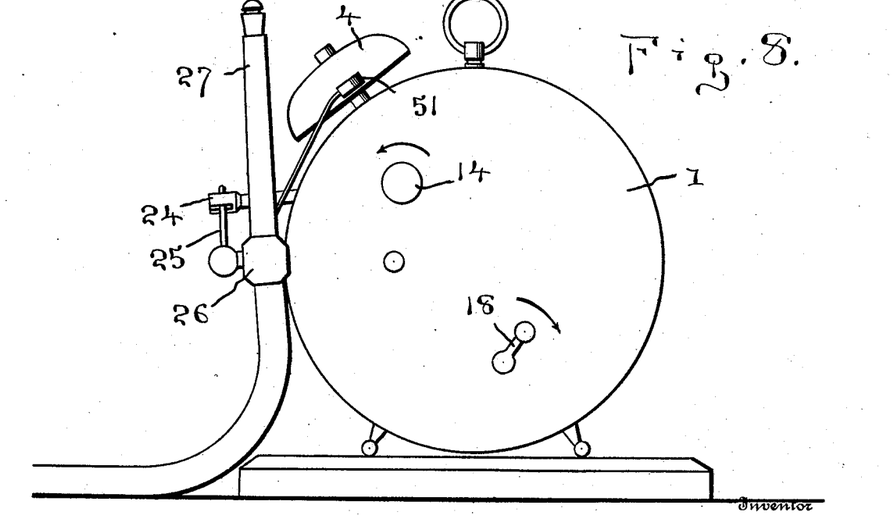
Fig. 8 is a rear elevation of the device.
Figure 9:
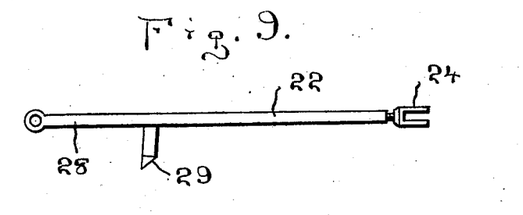
Fig. 9 is a detail plan view of the light-controlling arm.
Figure 10:
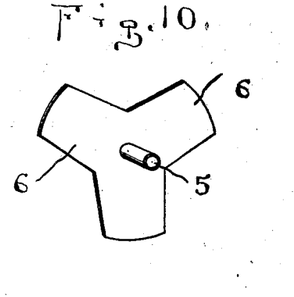
Fig. 10 is a perspective view of the friction-clutch.
Figure 11:
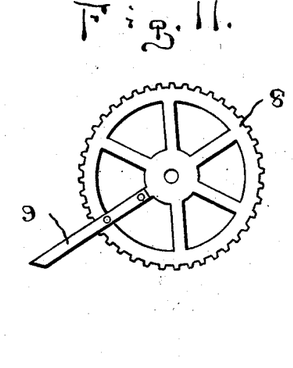
Fig. 11 is a plan view of the toothed wheel and the combined pointer and stop arm carried thereby.
Figure 12:
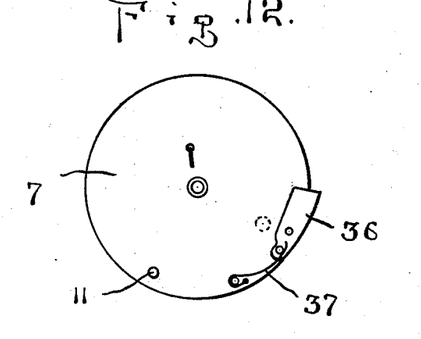
Fig. 12 is a view in elevation of the tripping-disk looking toward the inner side thereof.
Figure 13:
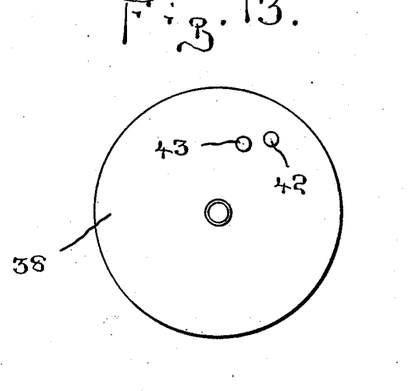
Fig. 13 is an inside face view of the setting-disk.
Figure 14:
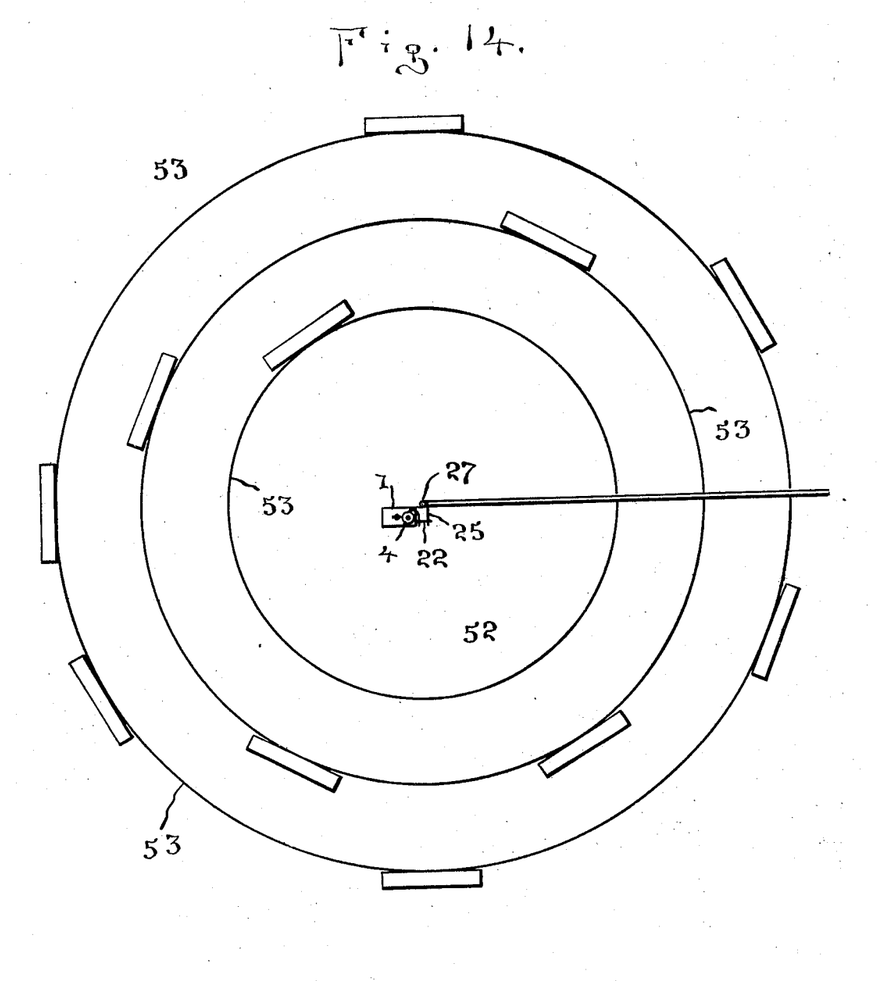
Fig. 14 is a diagrammatic plan view illustrating the manner of exposing negatives of different densities or printing qualities at one and the same time.

The light-controlling device hereinabove described is preferably used in connection with a table or other horizontal support 52, which has represented thereon a series of concentric circles 53. The timing device is placed on the table or support, so as to bring the gas-jet directly in the center of the circles, and then the frames containing the negatives and sensitized paper are placed along the circles, according to the density of the negatives and the differences in the printing qualities of the same. Where the negative is quite dense, it is placed in line with the inner circle and where the negative is quite weak it is placed at the outer circle, so that in this way the length of exposure is made to suit different negatives while giving the proper exposure to each.

In order to set the automatic time-light, the locking-dog 15 is swung out of engagement with the toothed wheel, and the latter is then turned by means of a handle 14 until the combined pointer and stop arm 9 is brought into line with the graduation representing the number of minutes the exposure is to continue. The dog is then released, so as to lock the toothed wheel 8 and keep the same stationary. The setting-disk is then turned in the direction indicated by the arrow, so as to raise the arm 22 until it is caught by the spring-catch and also to turn the tripping-disk 7 until the pin 11 contacts with the arm 9. The setting-disk is then turned to the right and released, and is carried back to its initial position by means of the spring which controls said disk. As the arbor of the minute-hand revolves it carries with it, by means of the friction-clutch, the tripping-disk. As the predetermined time elapses the trip on the tripping-disk pushes the spring-catch out of engagement with the catch-lip on the arm 22. Said arm being released, it falls, turning off the gas, and at the same time striking against the bell-crank lever and sounding the alarm.

Figure 15:
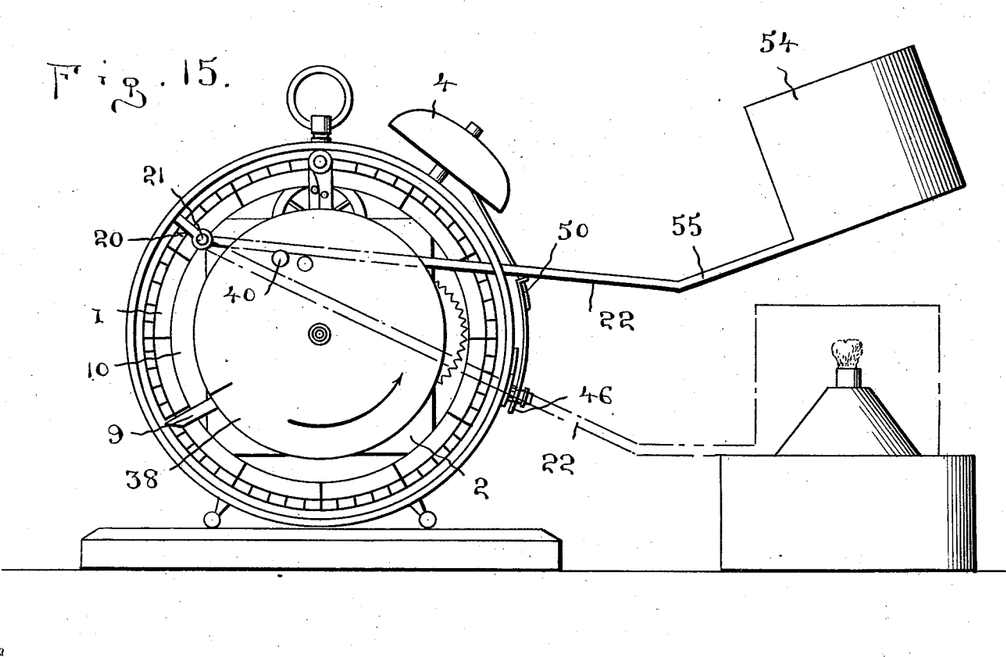
Fig. 15 is a view in elevation showing the device as applied to and used in connection with a lamp not controlled by a valve or switch.
Figure 16:
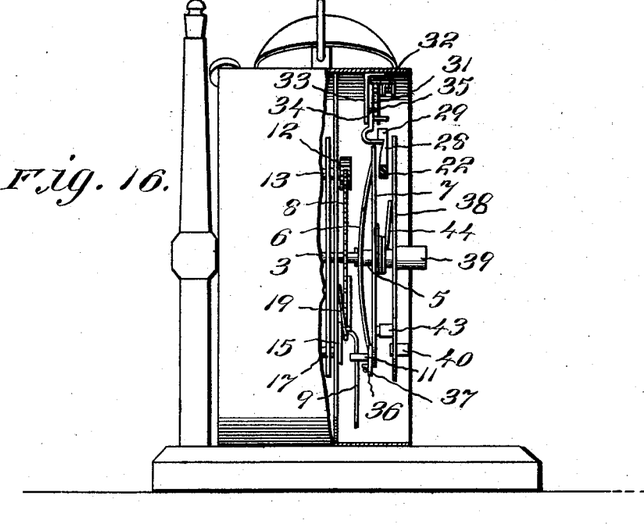

It will be understood that the arm 22 may be made to operate an electric switch instead of a gas-valve where an electric light is employed. The timing device may also be used in connection with a coal-oil lamp or a lamp supplied with gas, which is not controlled by means of a valve. This may be accomplished, as shown in Fig. 15, by employing a screen 54 of any suitable opaque material, carried by an extension 55 of the main arm 22, the said screen being adapted to be moved by means of said arm in front of and away from the light, so as to screen the negatives.

By means of the construction hereinabove described an exposure of any desired length of time may be obtained, and where the same negative is repeatedly exposed in order to secure a number of prints exactly the same amount of exposure may be given each time. The device requires no attention on the part of the photographer after it is once set. As soon as the exposure is complete the light is automatically extinguished or turned down and at the same time the alarm is given to notify the photographer, who is thus enabled to attend to other duties. It will also be apparent that any number of negatives of any size and of different densities may be exposed at one and the same time.

Having thus described the invention, I claim as new—

1. The combination with clock mechanism, of a tripping-disk mounted on the arbor of the minute-hand, a friction-clutch for causing said disk to normally rotate with the arbor, a light-controlling arm, and a spring-catch arranged in the path of the tripping-disk and adapted to engage the light-controlling arm.

2. The combination with clock mechanism, of a tripping-disk frictionally carried by the arbor of the minute-hand, a light-controlling arm adapted to be tripped and released by said tripping-disk, a dial, a combined pointer and stop-arm movable over the dial, a toothed wheel for setting said arm, and means for turning and locking said toothed wheel.

3. The combination with clock mechanism, of a toothed wheel mounted loosely on the arbor of the minute-hand, means for turning said wheel, a combined pointer and stop-arm carried by said wheel, a dial over the face of which said arm moves, a dog for locking said wheel at any point, a tripping-disk having a clutched engagement with said arbor and provided with a projection adapted to come in contact with the stop-arm, a light-controlling arm adapted to be tripped by said disk, and means for turning the disk on the arbor so as to carry the projection thereof into contact with the stop-arm in setting the device.

4. The combination with clock mechanism, and a dial, of a toothed wheel loosely mounted on the arbor of the minute-hand, a pinion for setting said wheel, a spring-dog for locking said wheel, a combined stop-arm and pointer carried by said wheel and movable over the dial, a tripping-disk having a frictional engagement with said arbor and provided with a pin or projection adapted to be moved into contact with the stop-arm, a light-controlling arm adapted to be tripped by said disk, and means for simultaneously setting the light-controlling arm and tripping-disk.

5. The combination with clock mechanism, and a dial, of a rotatable combined pointer and stop-arm movable over the dial, means for adjusting and locking said arm, a tripping-disk having a frictional engagement with the arbor of the minute-hand and having a projection adapted to be brought into contact with the stop-arm, a light-controlling arm, a spring-catch for upholding said arm and adapted to be released by the tripping-disk, and a setting-disk rotatably mounted on said arbor and having means for raising the light-controlling arm and turning the tripping-disk in setting the device.

6. The combination with clock mechanism, of a combined pointer and stop-arm rotatable around the arbor of the minute-hand, means for setting and locking said arm, a tripping-disk frictionally mounted on said arbor and having a projection movable into contact with the stop-arm, a light-controlling arm, a spring-catch engaging said arm and adapted to be tripped by said disk, a setting-disk rotatably mounted on the arbor and provided with means for lifting the light-controlling arm and setting the tripping-disk, and a spring for restoring the setting-disk to its normal position after setting the device.

7. The combination with clock mechanism, of a combined pointer and stop-arm rotatable around the arbor of the minute-hand, a dial over which said pointer travels, means for setting and locking said arm, a tripping-disk frictionally mounted on said arbor, and adapted to engage the stop-arm, a light-controlling arm adapted to be tripped by said disk, a swivel-fork mounted on the free end of said light-controlling arm, and a light-controlling valve having its stem in engagement with said fork.

8. The combination with clock mechanism, of a combined pointer and stop-arm rotatable around the arbor of the minute-hand, means for setting and locking said arm, a tripping-disk frictionally engaged with said arm and adapted to engage the stop-arm, a light-controlling arm adapted to be tripped by said disk, and alarm mechanism arranged in the path of movement of the light-controlling arm so as to be actuated thereby.

In testimony whereof I affix my signature in presence of two witnesses.

BRYAN P. O'NEILL.

Witnesses:
   HENRY J. O'NEILL,
   CLARENCE H. WOLF.